Oct. 4, 1927.
G. C. THOMAS, JR
1,644,297
CABLE CONNECTER
Filed Jan. 22. 1924
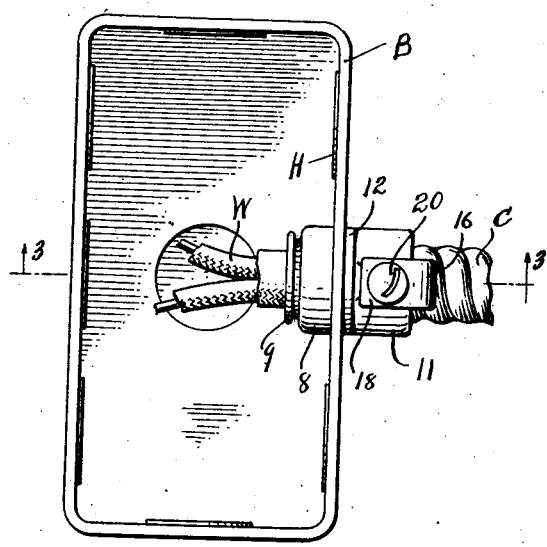
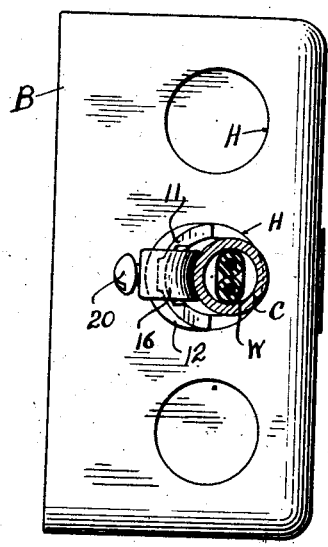
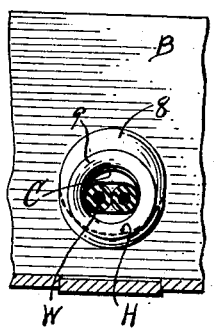
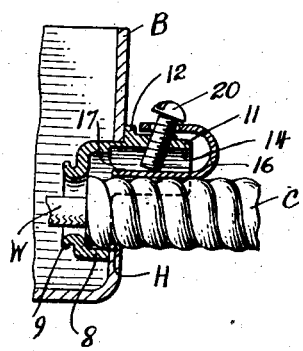
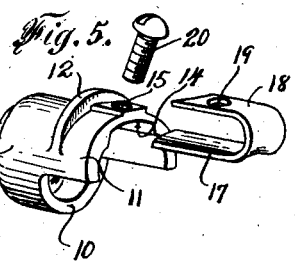
Inventor
George C. Thomas, Jr.
By Attorneys Patented Oct. 4, 1927.

1,644,297

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed January 22, 1924. Serial No. 687,786.

This invention relates to improved cable connecters for use in joining electric cables to outlet box fixtures and the like.

An object of the invention is to produce an improved cable connecter of simple structure which is capable of being manufactured at low cost and which positively anchors a cable to standard round knock-out holes in the usual run of electric fixture boxes such as cable and outlet boxes, switch and fuse boxes, and others.

Another object of the invention is to produce a connecter which is suitable in size to permit it to be placed in or through the cable opening or box hole and which connecter possesses characteristically novel means to permit the rim of the said box hole itself, or more particularly to permit a portion of said box hole rim or edge, to project into the inside of the connecter; the object of this arrangement being to provide a connecter, as for example a sleeve type connecter, which is received into the box hole and which sleeve at the same time receives a portion of the box hole edge thereinto. In other words, the sleeve is in the box hole and the box hole is in the sleeve. This produces a novel interlocking and interfitting relationship between the sleeve connecter and box hole so that a tapped or threaded hole is not required in the box by which to secure the connecter to the box by a screw.

A further object of this invention is to produce improvements over the structure of the cable connecter shown in the Webster Patent 1,245,077 dated October 30, 1917, in order that connecters not only be made of less material, but provide means for securing them to boxes without the usual expensive machining and cutting of screw threads on the connecter body, and a further object is to improve upon the connecter construction shown in my Patent, 1,514,408, the application for which was copending with this application.

The accompanying drawings illustrate preferred forms of the invention, the construction of which may be suitably varied or modified to better meet the manufacturer's and user's requirements without departing from the scope and principle of my invention.

Figure 1 illustrates a plan or top view of an outlet or cable box with the connecter shown assembled with the said box and a cable; and Figure 2 shows an end projection thereof.

Figure 3 illustrates a cross sectional view taken on the line 3—3 of the drawings; and Figure 4 shows an inside or rear end view of the connecter assembled in the box.

Figure 5 shows a perspective view of the connecter removed from the box with the said connecter parts shown in spaced relation serving to illustrate the detailed structure thereof.

Electrical fixture boxes having round knock-out holes H are in common every-day use and as heretofore stated, it is an object to provide inexpensive connecters to fasten by improved means the cable carrying electric transmission wires to the box; and with this in view the drawings illustrate the cable C carrying wires W anchored to the electric fixture or outlet box B by use of the improved connecter.

Referring first to the structure of the connecter, it is observed how the single piece casting consists of a short cable enclosing sleeve 8 which may be made slightly oblong or elliptic in cross section with its major axis slightly greater and its minor axis less than the diameter of the box hole H. The sleeve body 8 being elliptic thereby provides a shoulder face 10 standing transversely of the connecter axis and extending semicircumferentially of the body 8. The sleeve may be made with a wire bushing 9 at one end through which the wires W pass and are protected from being worn or abraded during the manipulation thereof.

The sleeve 8 is extended to form a projection 11, which may be semi-circular, for carrying a cable guard clamping means, and which projection or sleeve extension protrudes through the box wall B. The sleeve projection 11 is formed on a radius slightly less than that of the box hole, and carries a rib 12 which is extended semi-circumferentially around a portion of the body projection, the said rib being just long enough to form an adequate abutment surface against the box wall B on the outside thereof; and the said rib is offset from the shoulder face 10 a distance substantially equivalent to the thickness of the box wall B in order that the said connecter be inserted in the box knock-out hole H with the shoulder face 10 abutting the inside wall surface and with the rib 12 abutting the outer box wall surface. It is observed that the said shoulder face 10 and rib 12 are oppositely disposed in relation to each other with the box wall B disposed therebetween.

The sleeve extension or projection 11 may be made with an internal groove 14 cast in the connecter body projection 11 which runs from the rear end thereof forwardly. This groove 14 affords means for receiving a clamp and cable guard yoke as will be explained. The body projection 11 is likewise made with a threaded hole 15 for the reception of a clamp screw.

A clamp and guard yoke comprises parallel plates 17 and 18, one of which is made with an enlarged aperture 19 through which a clamp screw operating means 20 freely passes without being threaded to the yoke. The screw 20 retains the yoke or U-shaped member by freely passing through one leg or plate 18 thereof, and the said screw is adapted to be seated against the inner face of the lower plate 17 thereof to forcibly drive and clamp the pressure plate 17 into or against this pressure cable C; and the plate 17 may to advantage be made slightly longer than the upper plate 18 in order that the said part 17 reach forwardly and bear on the cable in direct line with the box wall just as shown in the drawing in order that the pressure of the screw 20 be distributed along the cable, but more particularly and what is more important, the plates 17 reaches beyond the box hole H in order that the pressure of the screw 20 be transferred by said plate 17 back to a point in alignment with the box edge or hole H to better pinch the cable against the edge or rim of the hole.

In assembling the box, cable, and a connecter, the said connecter is inserted into the box from either side thereof into the hole H with the rib 12 and shoulder face or sleeve end 10 resting against opposite surfaces of the wall of the box, and a cable C is inserted and the wires W thereof are projected through the bushing 9. Since the size of the sleeve 8 may be somewhat larger than the box opening, it follows that the sleeve end or face 10 abuts the box wall on one side and the rib 12 abuts the box on the outside thereby staying the connecter against movement. The sleeve face 10 preferably circles outside the rim of the knock-out opening in such a manner that the sharp corner burring edge of the box opening edge H is exposed inside the circle 10 which defines the inner radius of the sleeve 8 to contact said box edge with the cable C, and this contact or engagement extends circumferentially part-way around the cable C thereby increasing the surface area engagement existing between the round corrugated body of the cable C and the sharp box edge H. In other words, a portion of the circle defining the box edge H is inside the sleeve 8 which in effect places the box edge in the sleeve while the sleeve is at the same time in the box hole.

From the above description it is seen that the sleeve end 10 and rib or ear 12 constitute spaced box hole edge anchorage means, or abutment means, into and between which a box hole edge is positively seated not only to anchor the connecter in the box against longitudinal displacement, but to simultaneously cause the box hole edge to pinch or grip against the cable to thereby fix it between the exposed box hole edge H and bearing clamp plate 17.

The cable C rests against the box opening H with the inner end thereof seated against the shoulder bushing 9. The screw 20 is set up tightly against the yoke plate 17 thereby bearing with substantial force against the wall of the cable. The area of the plate 17 distributes the pressure imposed by the screw over a considerable area of the cable for it is observed that the plate 17 spreads across several corrugations thereof, and the plate 17 reaches back from the screw to a position directly over or in line with the box hole edge so that the plate 17 performs the important function of bearing and pressing the cable into the box hole edge. All the force of the screw is imposed directly upon the cable C without in any manner crushing or damaging it. Furthermore, the screw 20 may be carried in the connecter body at an angle as illustrated in order that the pressure exerted by the screw be imposed as much as possible over the box knockout hole edge H thereby pinching or clamping the cable C in the box opening.

The general overall shape and design of the connecter provides a combined or composite cylindrical part with a projecting half round cylindrical portion which leaves a corner gap extending deep into the part thereby forming the already described face 10 extending part way around the sleeve 8; and the rib 12 is made substantially opposite the end face 10, the said rib and face cooperating in slightly offset relation to provide means for firmly fixing the connecter to a box.

The connecter is economical to produce because the substantially large corner gap made in the sleeve incident to the formation of the shoulder face 10 affords a substantial saving in metal considering the fact that connecters have to be manufactured in large quantities. Furthermore, the end of the sleeve is not threaded, thereby saving largely in labor as to machine operations on the casting, and besides these advantages, the box does not need be manufactured with screw holes therein for the reception of screws by which connecters are attached to the box for indeed only one screw is here employed and it performs the double purpose of bearing and pressing the cable C against the box edge and simultaneously pressing the sleeve connecter itself against the box wall and in the box hole so that the rib 12 and face 10 interfit and interlock on opposite sides of the box wall which indeed characteristically places the connecter within the box hole and the hole itself within the connecter.

The connecter member is mutilated at one end to make a cut away sleeve end to form the corner gap construction and to form the short sleeve portion 8 with overhanging projection 11 which extends beyond the sleeve abutment end edge 10. The overhanging projection 11 carries a bearing clamp plate 17 of any suitable design. The operating means represented by the screw 20 may be mounted on either side of the rib 12 to bear on the clamp plate 17. The operating means such as a screw 20 together with the clamp plate 17 constitute cable clamp means. Thus the clamp means 20—17 is disposed above the cut away sleeve end edge 10 and is thereby advantageously disposed opposite the exposed portion of the box hole edge where it is most effective in gripping the cable C between the connecter and box wall edge, the clamp plate if U-shaped being mounted astride the portion 11 if desired.

Thus it is seen that I have produced a connecter so constructed and formed that it covers over and anchors to a part of the box hole edge and exposes the other part thereof together with a clamp plate which extends above, over, to or across the box hole edge; and operating means acts on the plate proximate that portion which overlies the hole edge to seat the anchorage means against the box hole edge and simultaneously grip the cable against the edge of the box hole.

What I claim is:—

1. Cable and box connecting means comprising, a box having a hole to receive a cable and connecter, a connecter suitable in size to fit into the box hole and formed to leave exposed a portion of said hole edge against which rests the cable, box hole edge anchorage means on the connecter into which seats a portion of the box hole edge to fit the connecter in the box, a screw threaded through the connecter and directed toward the cable, and a bearing clamp plate carried on the connecter between the screw end and cable overlying the exposed box hole edge and acted on by the screw to grip the cable between said box hole edge and plate and simultaneously seat the connecter anchorage means against said box hole edge.

2. A connecter comprising, a member suitable in size to fit into a box hole and formed to leave exposed a portion of said box hole edge for direct cable contact, anchorage means on the connecter by which it is anchored in a box hole, a bearing clamp plate mounted on the connecter and including an end which reaches into the connecter to overlie said exposed box hole edge, a screw threaded through the connecter to bear on the clamp plate, and said bearing clamp plate being adapted to transfer the pressure of the screw to the plane of a box hole edge.

3. A connecter adapted to fit in a box hole and receive cable therein comprising a sleeve including means to extend through a box hole and support the end of said sleeve against one side of the box wall, a cable clamp screw mounted in the connecter, a U-shaped bearing clamp plate placed astride the connecter, one leg of the U-shaped bearing plate including means by which the plate is attached to the connecter, and the other leg of the bearing clamp plate being disposed under the screw end and made relative long and thereby adapted to reach the plane of a box hole edge.

4. A connecter comprising, a member suitable in size to fit into a box hole and formed to leave a portion of said hole edge exposed for direct cable contact and including a cut away sleeve end forming an overhanging part, connecter anchorage means on the member to anchor it in a box hole, operating means carried with the connecter, a U-shaped clamp plate carried with the connecter astride the overhanging part and actuated by the operating means and including one end which is adapted to reach to the exposed box hole edge and including another end attached to the operating means to hold the clamp plate in position.

5. A connecter comprising, a member including a sleeve suitable in size to fit into a box hole and formed to expose a portion of the box hole edge, and anchorage means which attaches to and conceals the other portion of said hole edge to fix the connecter in a box, a clamp plate carried with the connecter and adapted to overlie the exposed box hole edge; and operating means adapted to act on the clamp plate proximate the portion which overlies said exposed box hole edge, to grip a cable between the box hole edge and clamp plate, and to positively seat said anchorage means against said concealed portion of the hole edge.

In testimony whereof I affix my signature.

GEORGE C. THOMAS, JR.